June 16, 1925.
C. C. LEONARD
1,542,152
DIRECTION SIGNAL FOR AUTOMOBILES
Filed Aug. 14, 1924
2 Sheets-Sheet 1
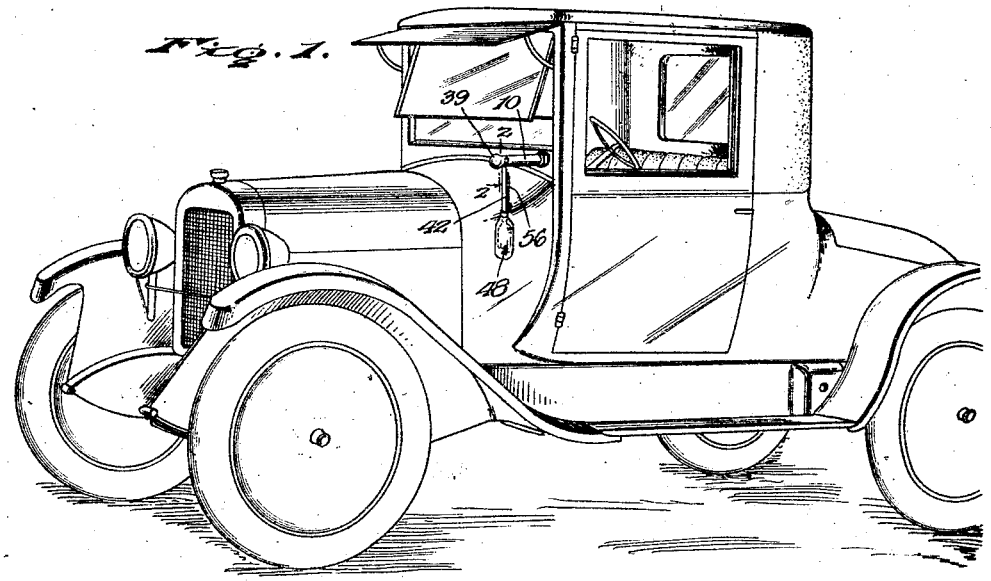
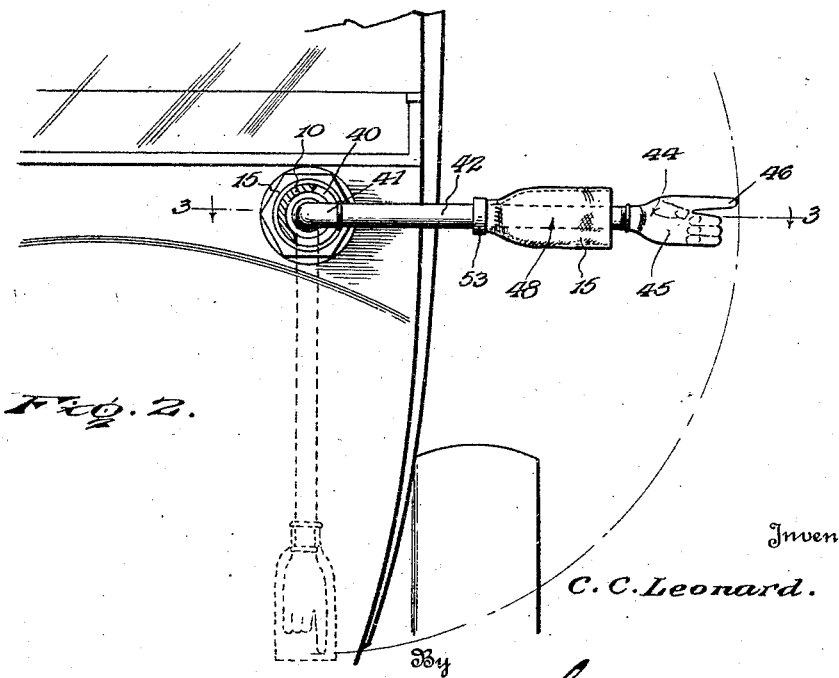
Inventor
C. C. Leonard.
By Lacey & Lacey, Attorneys

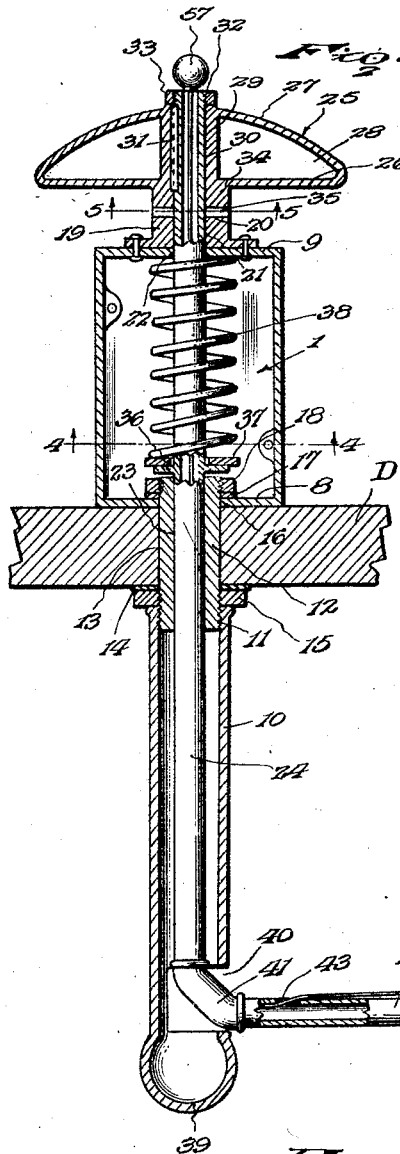

Patented June 16, 1925.

1,542,152

UNITED STATES PATENT OFFICE.

CLARENCE C. LEONARD, OF ERIE, PENNSYLVANIA.

DIRECTION SIGNAL FOR AUTOMOBILES.

Application filed August 14, 1924. Serial No. 732,006.

*To all whom it may concern:*

Be it known that I, CLARENCE C. LEONARD, a citizen of the United States, residing at Erie, in the county of Erie and State of Pennsylvania, have invented certain new and useful Improvements in Direction Signals for Automobiles, of which the following is a specification.

This invention relates to improvements in direction signals for automobiles and has as its general object to provide a signal which may be readily manipulated by the driver of the automobile to indicate to the driver of a following machine, his intention to stop, turn to the right, or turn to the left.

It is customary, where no electrically lighted signal or no mechanical signal is employed upon an automobile, for the driver to indicate his intention to stop or turn to the right or left, by well understood movements of his left hand or arm, and, in daylight driving, this is the most effective means for indicating the driver's intentions. However, signaling in this manner necessitates moving the hand a considerable distance from the steering wheel so that, in turning a corner, the right hand alone must perform the function of operating the steering wheel. In view of the foregoing, the present invention has as one of its important objects to provide a direction indicating device which may be quickly and readily set to any required position, by the driver of the automobile, to indicate his intentions and, which, when set in a position to indicate his intention to turn to the right or to the left, may be permitted to remain in such position and thereby permit him to use both hands in manipulating the steering wheel of the machine in making the turn.

Another object of the invention is to provide a direction signal designed especially for use on closed cars, in driving which cars, in inclement weather, it is impracticable for the driver to signal with his left hand if the left hand window of the car is closed or partially closed, the signal of the present invention being operable wholly from within the car.

The signal proper of the device embodying the invention is in the nature of a member representative of the human hand and in order that the device, when in its normal position will not be conspicuous, the invention contemplates, as a further object, to provide means for concealing this member from view, the concealing means being adjustable, however, to expose the said member as occasion may require.

In the accompanying drawings:

Figure 1 is a perspective view illustrating the application of the device embodying the present invention, to a closed car, the parts being illustrated in full lines in the position which they will normally assume and in dotted lines in one of the signaling positions.

Figure 2 is a vertical transverse sectional view taken substantially on the line 2—2 of Figure 1, in detail, looking in the direction indicated by the arrows.

Figure 3 is a horizontal sectional view taken substantially on the line 3—3 of Figure 2, in detail, looking in the direction indicated by the arrows.

Figure 4 is a vertical transverse sectional view taken substantially on the line 4—4 of Figure 3, looking in the direction indicated by the arrows.

Figure 5 is a similar view on the line 5—5 of Figure 3.

Figure 6 is a perspective view of the enclosing and concealing means for the signal member of the device, the said signal member and its arm being shown in dotted lines.

Figure 7 is a vertical sectional view taken substantially on the line 7—7 of Figure 5, looking in the direction indicated by the arrows.

While the signaling device of the present invention is designed primarily for installation upon closed cars, it is by no means limited to this use, and ordinarily it will be installed upon the dashboard of the car indicated by the reference letter D, as illustrated clearly in Figures 1, 2 and 3 of the drawings. The device includes a housing indicated in general by the numeral 1, which consists of a body member 2 having spaced side walls 3, a transversely arched top wall 4, and a bottom 5 which is preferably secured removably to the body 2 by screws or the like 6, which are passed through openings in the marginal portions of the said bottom and are threaded into lugs 7 upon the lower edges of the side walls 3. The housing is closed at its forward end by an end wall 8 and at its rear end by an end wall 9. The device further includes a tubular casing member 10 which is interiorly threaded at its rear end as indicated by the numeral 11, and a bushing 12, exteriorly threaded at its opposite ends, is fitted through an opening 13 formed in the dash D and has its forward end threaded into the threaded end 11 of the said casing 10. A washer 14 is disposed upon the bushing 12 near the forward end thereof and rests against the forward side of the dash D, and a nut 15 is threaded onto the threaded forward end of the bushing and bears against the said washer, the casing member 10 being, as stated, threaded onto the said end of the bushing so that its said end will bear against the nut 15. The forward end wall of the housing 1 is formed with an opening 16 which receives the rear end of the bushing 12, and a washer 17 and nut 18 are threaded onto the rear end of the said bushing 12. In this manner, the housing 1 and casing member 10 are securely mounted upon the dash of the vehicle.

Secured upon the outer face of the rear end wall 9 of the housing 1, is a cylindrical boss 19 the rear end of which is formed with radial corrugations indicated by the numeral 20. The said boss 19 is formed axially with an opening 21 which registers with an opening 22 formed in the said end wall 9 of the housing, and these openings are in axial alinement with the bore 23 of the bushing 12. A tubular spindle 24 is rotatably mounted in the bore of the bushing and in the openings 21 and 22 and extends rearwardly beyond the rear end of the boss 19. The numeral 25 indicates in general the actuating handle of the device and this handle is of substantially the form shown in the drawings, comprising a hollow knob having a substantially semi-circular front wall 26 and a concavo-convex rear wall 27 and an open segmental bottom 28. This handle may assume some other form but the form herein shown and described is to be preferred. The handle is formed with a barrel 29 symmetrically located with relation to the marginal portions of the knob, and this barrel has a bore indicated by the numeral 30. The spindle 24, at its rear end, extends into the bore 30 of the knob and is held for rotation therewith by a key 31 fitted into registering grooves in the outer side of the said end of the spindle and the wall of the bore 30. The extreme end of the spindle 24 is threaded as indicated by the numeral 32, and a nut 33 is threaded onto this end of the spindle and is tightened to bear against the rear wall 27 of the knob. A boss 34 is formed upon the front wall 26 of the knob and is of cylindrical form and concentric to the axis of the bore 30 in the barrel 29, and this boss is provided with a number of radial corrugations 35 which are adapted to match or engage with the corrugations of the boss 19 so that upon rotation of the knob, the spindle 24 will be rotated and, due to the interengagement of the said corrugations, will be held at any desired point in its rotative adjustment. A collar 36 is brazed or otherwise secured upon the spindle 24 within the housing 1, and a collar 37 is likewise fitted onto the spindle and bears against the collar 36, a coil spring 38 being also disposed about the spindle with one end bearing against the said collar 37 and its other end bearing against the inner side of the rear end wall 9 of the housing 1. In this manner, the corrugations 35 upon the boss 34 carried by the hand knob 25 are held in engagement with the corrugations 20 upon the boss 19 which is fixed with relation to the housing 1. Therefore, when the spring 38 is free to act, the spindle will be held against rotation or, in other words, in any position to which it has been adjusted, and when it is desired to rotate the spindle to another position of adjustment, a rearward pull is exerted upon the knob 25 and the knob is, at the same time, turned, the rearward pull upon the knob serving to slightly compress the spring 38 and disengage the corrugations 35 from the corrugations 20, to permit of such rotative adjustment of the said spindle 24.

At this point it will be evident that the hand knob 25 and housing 1 are located within the automobile and that the casing member 10 extends forwardly beyond the dash exteriorly of the automobile. The forward end of the tubular casing 10 is closed by a substantially spherical head 39 and the said casing is formed, in its side which is presented toward the left hand side of the roadway, in the travel of the car, with an arcuate slot indicated by the numeral 40. The numeral 41 indicates an elbow connection which is fitted at one end to the forward end of the spindle 24 and which extends laterally through the slot 40 and has fitted to its other end, one end of a tubular arm indicated by the numeral 42, this arm, adjacent its inner end, being formed in one side with an opening 43 for a purpose to be presently explained. The numeral 44 indicates the signal member of the device, which member may be in the nature of a plate 45 representative of a human hand with the forefinger 46 extended and the other fingers and thumb bent, and the said plate is provided at that end which represents the wrist of the hand, with a socket member 47 into which is threaded or otherwise secured the outer end of the arm 2. At this point, it will be evident that by suitably adjusting the hand knob 25, the arm 42 may be caused to assume a vertical depending position, as shown in Figure 1 of the drawings, in which position it will not be visible to the driver of a following car. When it is desired to signal the intention of the driver of the car equipped with the device, to stop, the hand knob 25 will be grasped and the knob will be oscillated so as to cause an up and down swinging movement of the arm 42, as indicated by the arcuate dotted line in Figure 2 of the drawings, this being the customary signal given by the left hand under the condition stated. When it is desired to indicate the intention of the driver of the car to turn to the left, the hand knob 25 is retracted and the knob is adjusted so as to swing the arm 42 to a substantially horizontal position, as shown in full lines in Figure 2 of the drawings and in dotted lines in Figure 1, the knob being then released until after the turn has been made. Inasmuch as the spindle 24, after release of the knob, is held in the position to which it has been adjusted through rotation of the knob, the driver may grasp the steering wheel with his left hand and thus more conveniently steer the machine in making the turn. Likewise, when it is desired to indicate the intention of the driver to turn to the right, the knob 25 is manipulated as before stated until the arm 42 assumes an upwardly inclined position, as shown in dotted lines in Figure 2, in which position the outer end of the elbow 41 will rest against the upper end of the arcuate slot 40, thereby enabling the driver to quickly swing the arm to this position without paying any particular attention to the actual position of the arm, the end wall of the said slot constituting an abutment to limit rotative movement of the hand knob 25 to this position.

As previously stated, it is desirable to provide means for concealing the signal member 44 when the same is in normal or the depending position shown in full lines in Figure 1, and this means comprises a concealing member which is indicated in general by the numeral 48. The said member 48 comprises a housing having side walls 49 and front and rear walls 50, and the said housing is open at its outer end as indicated by the numeral 51 and at its inner end is somewhat contracted, as at 52, and secured within a substantially annular metallic binding member 53 which fits freely slidably upon the arm 42. The housing is preferably formed from some material corresponding in color to the finish of the car as, for example, the material employed in the manufacture of car tops, or it may be of any other desired material, and it is held distended and in proper shape by suitable bracing members 54 which are arranged within the housing and riveted or otherwise secured as at 55, to the walls thereof. The housing is of a shape and dimensions to completely house and conceal the signal member 44 when the housing is in the position illustrated in Figure 3 of the drawings, in which position the binding member 53 is in engagement against the end of the socket 47 of the said signal member, and upon sliding the said binding member inwardly along the arm 42, the housing will uncover and expose the said signal member. In order that this may be accomplished when the arm 42 is extended horizontally, a flexible element 56 is connected at one end to the binding member 53 as indicated by the numeral 57', and is led through the opening 43 and through the hollow elbow 41 and spindle 24, to the rear end of the spindle where it is connected to a knob or any other suitable type of finger piece indicated by the numeral 57, which may be grasped for the purpose of pulling upon the element 56 to slide the binding member 53 inwardly along the arm 42 and thereby retract the housing member 48 and expose the signal member 44. It will be evident that when the arm 42 is swung downwardly to the normal position, the concealing member 48 will drop by gravity to a position covering the signal member 44 and thereby rendering the device inconspicuous. When the arm 42 is swung to horizontal position, the knob 57 will be grasped and a pull will be exerted upon the element 56 to retract the concealing member and expose the signal member, and when the arm is swung to the elevated position indicating a turn to the right, the said concealing member will, as in the first instance, drop by gravity to a position exposing the said signal member. Preferably, the signal member 44 will be painted with a luminous paint so that it will be visible at night as well as during daylight hours.

Having thus described the invention, what I claim is:

1. A direction signal comprising a housing, a tubular casing, a bushing connecting the two and adapted to be fitted through a part of the body of an automobile whereby to mount the housing and tubular casing thereon, a spindle extending through the bushing and rotatably and shiftably mounted therein, the said spindle extending into the housing and beyond one end thereof and likewise, extending within the said casing, an arm connected with that portion of the spindle which extends within the casing and extending radially from the spindle, a signal member carried by the arm, a handle member carried by the other end of the spindle exterior to the housing, coacting locking elements upon the handle member and the housing adapted to be mutually engaged when the spindle is shifted in one direction and to be mutually disengaged when the spindle is shifted in the opposite direction, and a spring within the housing coacting with the spindle to yieldingly hold the same shifted in the first mentioned direction.

2. A direction signal comprising an angularly adjustable arm, means whereby the arm may be adjusted, a signal member carried by the arm, and a concealing member carried by the arm and movable into and out of position to conceal the said signal member.

3. A direction signal comprising an angularly adjustable arm, means whereby the arm may be adjusted, a signal member carried by the arm, and a concealing member slidably mounted upon the arm and arranged in one position to enclose and conceal the signal member, and means operatively connected with the said concealing member and manually operable to retract the same along the arm to expose the signal member.

4. A direction signal comprising a rotatable spindle of hollow form, an arm extending radially therefrom and likewise of hollow form, a signal member carried by the arm, means connected with the spindle whereby it may be rotatably adjusted to angularly adjust said arm, means for retaining the spindle in different positions of adjustment, a concealing member carried by the arm and movable into and out of position to conceal the said signal member, a flexible pull element connected with the said concealing member and led through the arm and through the said spindle, and a finger piece connected with the said flexible element adjacent the adjusting means for the spindle.

In testimony whereof I affix my signature.

CLARENCE C. LEONARD. [L. S.]